US012154713B2

(12) United States Patent
Chou

(10) Patent No.: US 12,154,713 B2
(45) Date of Patent: Nov. 26, 2024

(54) PIN STRUCTURE OF TRANSFORMER BOBBIN

(71) Applicant: INNOTRANS TECHNOLOGY CO., LTD., New Taipei (TW)

(72) Inventor: Tsung-Han Chou, Keelung (TW)

(73) Assignee: INNOTRANS TECHNOLOGY CO., LTD., New Taipei (TW)

( * ) Notice: Subject to any disclaimer, the term of this patent is extended or adjusted under 35 U.S.C. 154(b) by 729 days.

(21) Appl. No.: 17/315,979

(22) Filed: May 10, 2021

(65) Prior Publication Data

US 2021/0358675 A1 Nov. 18, 2021

(30) Foreign Application Priority Data

May 14, 2020 (TW) ................................ 109116100

(51) Int. Cl.
*H01F 27/29* (2006.01)
*H01F 27/26* (2006.01)

(52) U.S. Cl.
CPC ........... *H01F 27/266* (2013.01); *H01F 27/29* (2013.01); *H01F 2027/297* (2013.01)

(58) Field of Classification Search
CPC .. H01F 27/266; H01F 27/29; H01F 2027/297; H01F 27/292; H01F 5/02; H01F 5/04; H01F 27/2828; H01F 27/325; H01R 4/02; H02K 3/525; H02K 15/0056; H02K 15/0068
See application file for complete search history.

(56) References Cited

U.S. PATENT DOCUMENTS 3,663,914 A * 5/1972 Lane ......................... H01F 5/04 439/874
3,800,172 A * 3/1974 Artin ...................... H02K 3/524 310/71
4,546,340 A * 10/1985 Kuchuris ................ H01F 27/29 336/208
5,008,644 A * 4/1991 Cooper ..................... H01F 5/04 336/208

(Continued)

FOREIGN PATENT DOCUMENTS

TW 301456 U 3/1997
TW I343585 6/2011

(Continued)

*Primary Examiner* — Mang Tin Bik Lian
(74) *Attorney, Agent, or Firm* — MUNCY, GEISSLER, OLDS & LOWE, P.C.

(57) ABSTRACT

A pin structure of a transformer bobbin is provided. The transformer bobbin includes a winding part on which at least one winding is wound, and at least one wire outlet part arranged on a side of the winding part. The pin structure includes at least two accommodating slots arranged at the wire outlet part, and at least two conductive pins. Each of the accommodating slots has two first sections and a second section connected to the two first sections. Each of the conductive pins corresponds to one of the accommodating slots, and includes a connection section in the second section and two exposed sections connected to the connection section and extending to an outside of the winding part via the two first sections. One exposed section can perform socket welding, and the other one is bendable to define the end of the winding with the wire outlet part.

6 Claims, 5 Drawing Sheets

(56) References Cited

U.S. PATENT DOCUMENTS

| | | | | | |
|---|---|---|---|---|---|
| 5,726,616 | A * | 3/1998 | Bell | H01F 27/266 | 336/198 |
| 7,498,917 | B1 * | 3/2009 | Yang | H05K 1/18 | 336/212 |
| 2005/0073385 | A1 * | 4/2005 | Wu | H01F 27/325 | 336/208 |
| 2008/0252409 | A1 * | 10/2008 | Kojima | H01F 38/14 | 336/185 |
| 2009/0309686 | A1 * | 12/2009 | Espino | H01F 27/06 | 336/182 |
| 2011/0043315 | A1 * | 2/2011 | Kobayashi | H01F 27/325 | 29/606 |
| 2011/0090037 | A1 * | 4/2011 | Tsai | H01F 27/324 | 336/220 |
| 2011/0260820 | A1 * | 10/2011 | Liao | H01F 27/325 | 336/192 |
| 2012/0161913 | A1 * | 6/2012 | Yen | H01F 27/025 | 336/212 |
| 2013/0135073 | A1 * | 5/2013 | Maeda | H01F 27/29 | 336/192 |
| 2017/0249265 | A1 * | 8/2017 | Shaeffer | G06F 13/4068 | |
| 2019/0080836 | A1 * | 3/2019 | Yasuda | H01F 27/29 | |

FOREIGN PATENT DOCUMENTS

| | | |
|---|---|---|
| TW | D170621 | 9/2015 |
| TW | I501270 | 9/2015 |
| TW | D171247 | 10/2015 |

* cited by examiner

PIN STRUCTURE OF TRANSFORMER BOBBIN

FIELD OF THE INVENTION

The present invention relates to a pin structure of a transformer bobbin, and particularly relates to a pin structure of a transformer bobbin, a conductive pin of which has two exposed sections.

BACKGROUND OF THE INVENTION

Nowadays, some practitioners also provide a conductive pin with a special structure for transformers for use in addition to traditional metal single-post pins. The foregoing conductive pin with the special structure is disclosed like Taiwan patents No. 301456, No. I343585, No. I501270, No. D171247, and No. D170621. Although the conductive pin disclosed in the previous patents simplifies the connection process for the tail end of a winding and the conductive pin through the special structure, in order to produce the aforementioned special structure, the conductive pin needs to be subjected to machining procedures such as stamping during the research and development, and wastes produced in the stamping process is a waste of cost for the practitioners.

SUMMARY OF THE INVENTION

The present invention is mainly directed to solve the problems caused by implementation of a conductive pin with a special structure.

In order to achieve the above objective, the present invention provides a pin structure of a transformer bobbin. The transformer bobbin is provided with a winding part which is bound with at least one winding thereon, and at least one wire outlet part arranged on one side of the winding part. The pin structure includes at least two accommodating slots arranged at a spacing from one another at the at least one wire outlet part, and at least two conductive pins. Each of the accommodating slots is formed with an entrance and two pin outlets located on a plane different from the entrance, and includes two first sections respectively communicated with the two pin outlets, and one second section connected to the two first sections. Each of the conductive pins corresponds to one of the accommodating slots, and is placed via the entrance of the accommodating slot. Each of the conductive pins has a connection section located in the second section and two exposed sections respectively connected to the connection section. The two exposed sections respectively extend to the two first sections and penetrate through the two pin outlets to an outside of the winding part. One of the two exposed sections can be provided for performing socket welding, and the other exposed section is bendable to define a tail end of the winding together with the wire outlet part.

In one embodiment, each of the accommodating slots is U-shaped, and each of the conductive pins is also U-shaped.

In one embodiment, one of the exposed sections for performing socket welding is longer than the other one of the exposed sections.

In one embodiment, a length of one of the exposed sections exposed from the at least one wire outlet part without socket welding is greater than a length of the second section.

In one embodiment, the transformer bobbin is provided with a cover at least covering the wire outlet part to limit the conductive pins.

According to the present invention, compared with the prior art, the present invention has the following characteristics: in the pin structure of the present invention, by means of cooperation between each of the accommodating slots and each of the conductive pins, even though each of the conductive pins does not need to have a complicated structure, the objectives of providing socket welding and limiting the tail end of the winding are achieved by the two exposed sections. During research and development, each of the conductive pins generates a specific wiring structure without stamping, so that production of wastes is avoided, and the production cost is reduced.

DETAILED DESCRIPTION OF THE PREFERRED EMBODIMENTS

Figure 1:
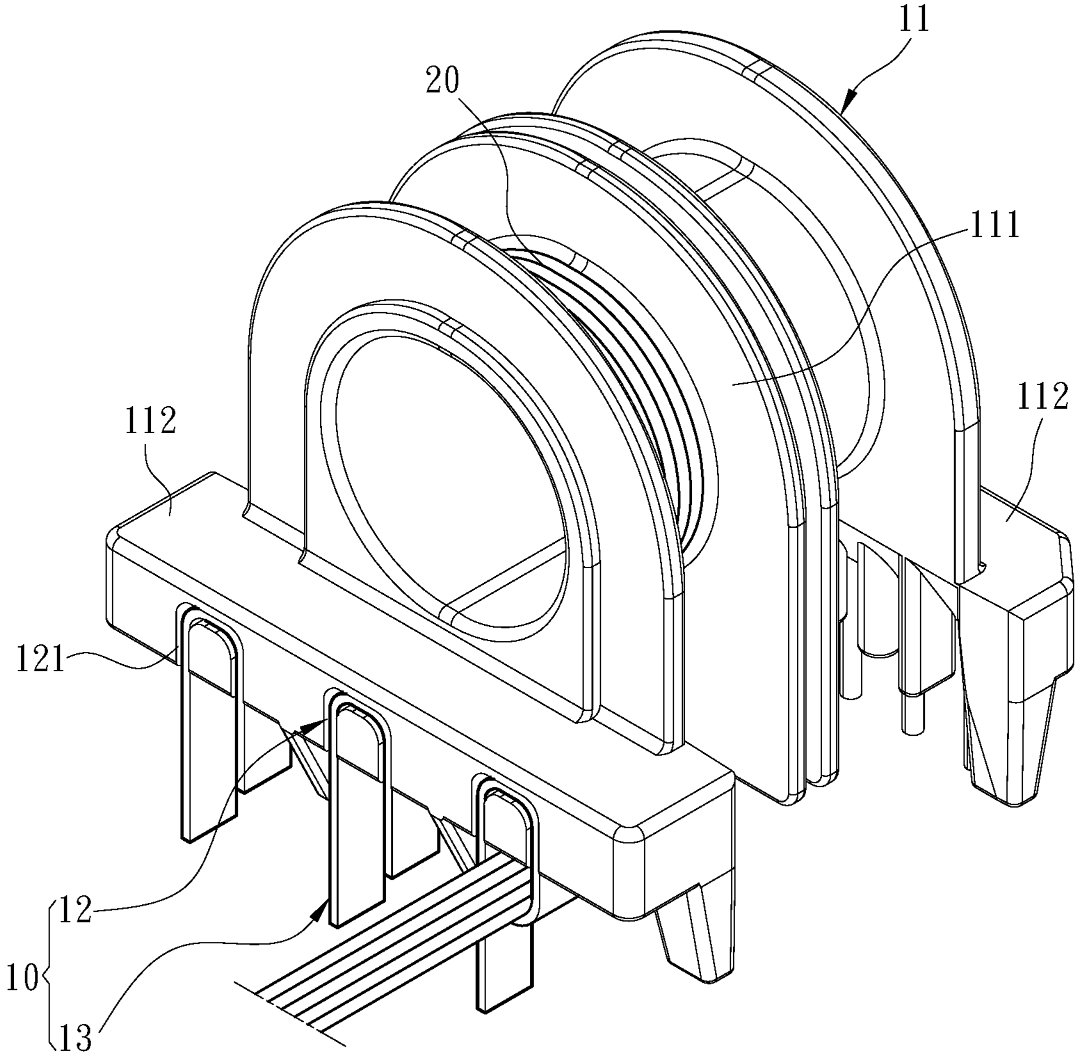
FIG. 1 is a schematic structural diagram of a transformer bobbin of one embodiment of the present invention.
Figure 2:
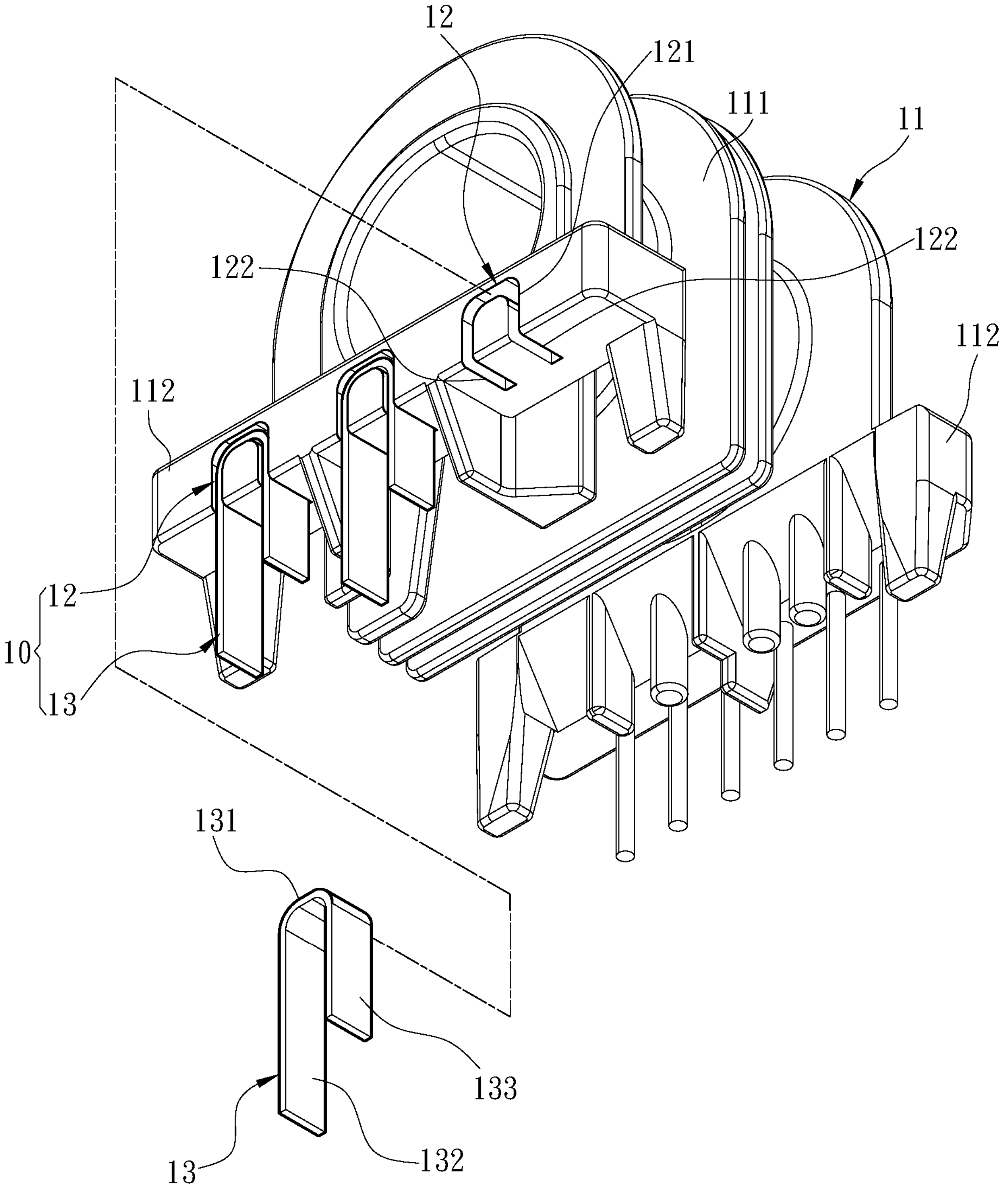
FIG. 2 is a partially structural exploded diagram of a transformer bobbin of one embodiment of the present invention.

Detailed descriptions and technical contents of the present invention will be explained below in combination with accompanying drawings.

Referring to FIG. 1 to FIG. 4, the present invention provides a pin structure 10 of a transformer bobbin. The transformer bobbin 11 includes a winding part 111 which is bound with at least one winding 20 thereon, and at least one wire outlet part 112 arranged on one side of the winding part 111. Further, the transformer bobbin of the present invention is not limited to an upright type shown in the figures, but it can be of a horizontal type. The pin structure 10 of the present invention includes at least two accommodating slots 12 arranged at the at least one wire outlet part 112, and at least two conductive pins 13 respectively corresponding to the at least two accommodating slots 12. Further, the at least two accommodating slots 12 are formed in the at least one wire outlet part 112 at intervals, and each of the at least two accommodating slots 12 is formed with an entrance 121 and two pin outlets 122 located on a different plane from the entrance 121. Further, the entrance 121 and the two pin outlets 122 are respectively located on two side surfaces of the wire outlet part 112. If the entrance 121 is located on a side surface of the whole transformer bobbin 11, the two pin outlets 122 can be located on a bottom surface of the whole transformer bobbin 11. In addition, each of the at least two accommodating slots 12 includes two first sections 123 respectively communicated with the two pin outlets 122, and a second section 124 connected to the two first sections 123. Therefore, each of the at least two accommodating slots 12 of the present invention is U-shaped or similarly U-shaped. In addition, the two first sections 123 are not limited to the parallel disposing shown in the figures, and can be appropriately adjusted according to an implementation requirement. Further, the depth of each of the at least two accommodating slots 12 can be set according to the width of one of the at least two conductive pins 13 placed therein.

Referring to FIG. 1, FIG. 2, FIG. 3 and FIG. 4, each of the at least two conductive pins 13 only corresponds to one of the accommodating slots 12, and each of the at least two conductive pins 13 is placed via the entrance 121 of each of the at least two accommodating slots 12. Further, each of the at least two conductive pins 13 is integrally formed by a metal plate. The structure of each of the at least two conductive pins 13 needs to match each of the at least two accommodating slots 12, and is U-shaped or similarly U-shaped. Each of the at least two conductive pins 13 has a connection section 131 located in the second section 124 and two exposed sections 132, 133 which are connected to the connection section 131. The two exposed sections 132, 133 respectively extend to the two first sections 123 and penetrate through the two pin outlets 122 to an outside of the winding part 111. One of the two exposed sections 132, 133 can perform socket welding, and the other one of the two exposed sections is bendable to define a tail end of the at least one winding 20 together with the at least one wire outlet part 112. That is, each of the at least two conductive pins 13 of the present invention includes the two exposed sections 132, 133 extending to the at least one wire outlet part 112, but the two exposed sections 132, 133 are different from conventional transformer pins, and are not used for coiling and outgoing of the tail end of the at least one winding 20. In addition, each of the at least two conductive pins 13 of the present invention is implemented by a metal plate, so that it can bear a relatively high current. During research and development, each of the at least two conductive pins 13 generates a specific wiring structure without stamping, so that production of wastes is avoided, and the production cost is reduced.

Figure 3:
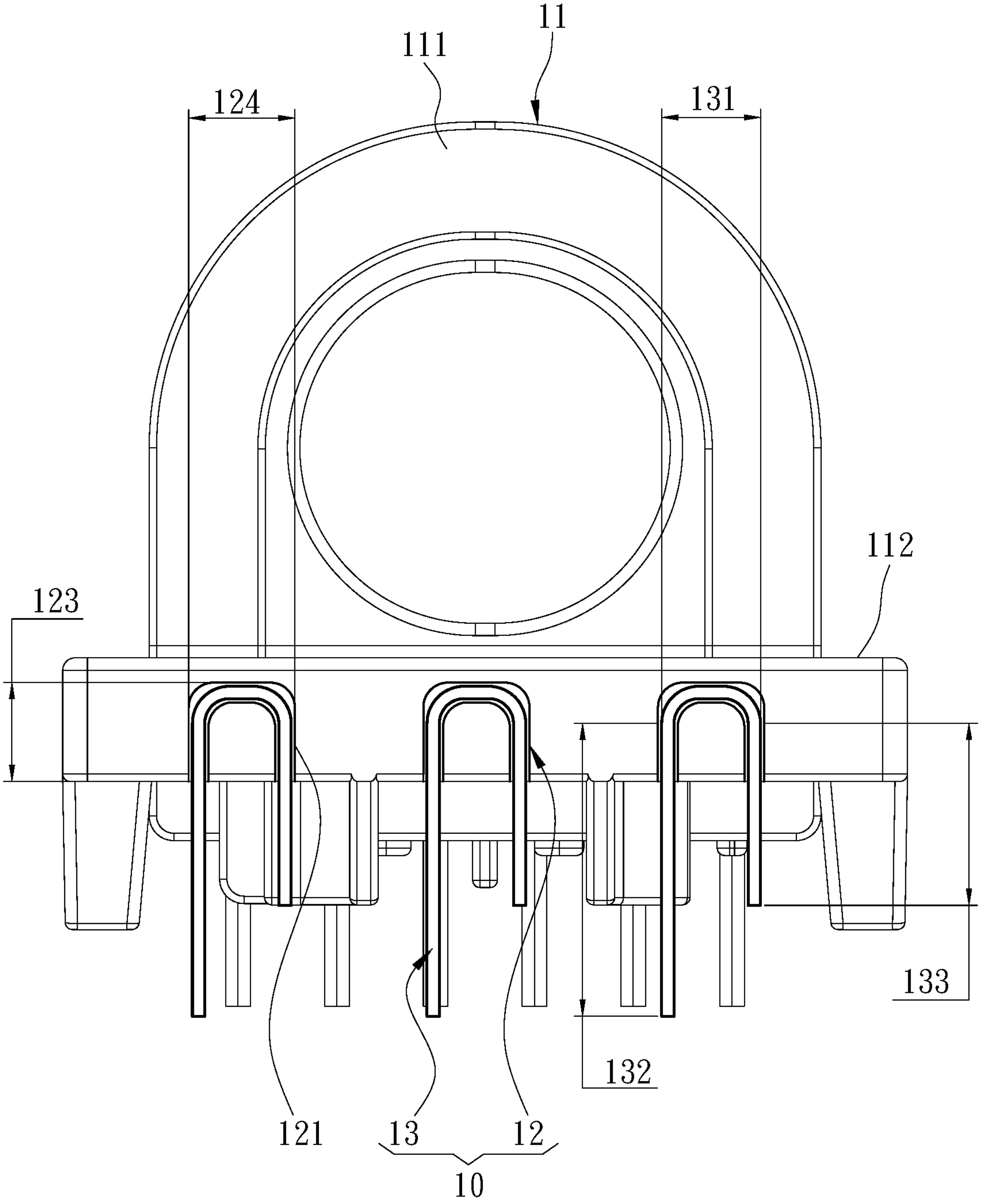
FIG. 3 is a schematic structural side-view diagram of a transformer bobbin of one embodiment of the present invention.
Figure 4:
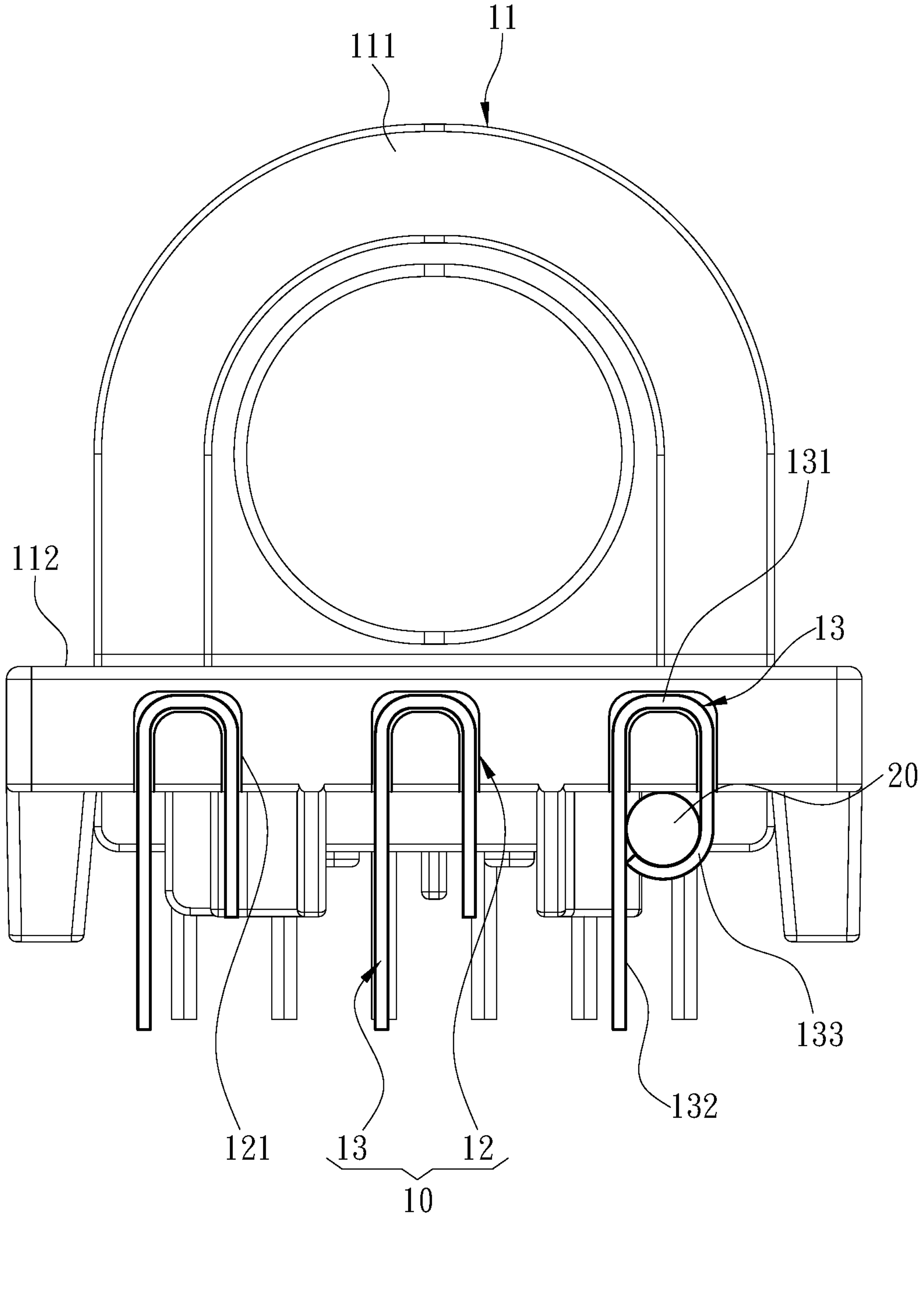
FIG. 4 is a schematic diagram of implementation of a transformer bobbin of one embodiment of the present invention.

Referring to FIG. 3 and FIG. 4, in order to make one of the exposed sections 132 of each of the at least two conductive pins 13 definitely perform the socket welding, in one embodiment, the exposed section in the two exposed sections 132, 133 used for the socket welding is longer than the other exposed section, as shown in FIG. 3. In addition, in order to enhance the contact between each of the at least two conductive pins 13 and the tail end of the at least one winding 20, a conduction relationship between each of the at least two conductive pins 13 and the at least one winding 20 and the restriction to the tail end of the at least one winding 20 are enhanced. In one embodiment, a length of one of the two exposed sections 132, 133 exposed from the at least one wire outlet part 112 without socket welding is greater than a length of the second section 124. Therefore, after being bent, the exposed section 133 can specifically restrain the tail end of the at least one winding 20, and can be further in contact with the exposed section 132 to greatly enhance the conduction relationship between the at least two conductive pins 13 and the at least one winding 20.

Figure 5:
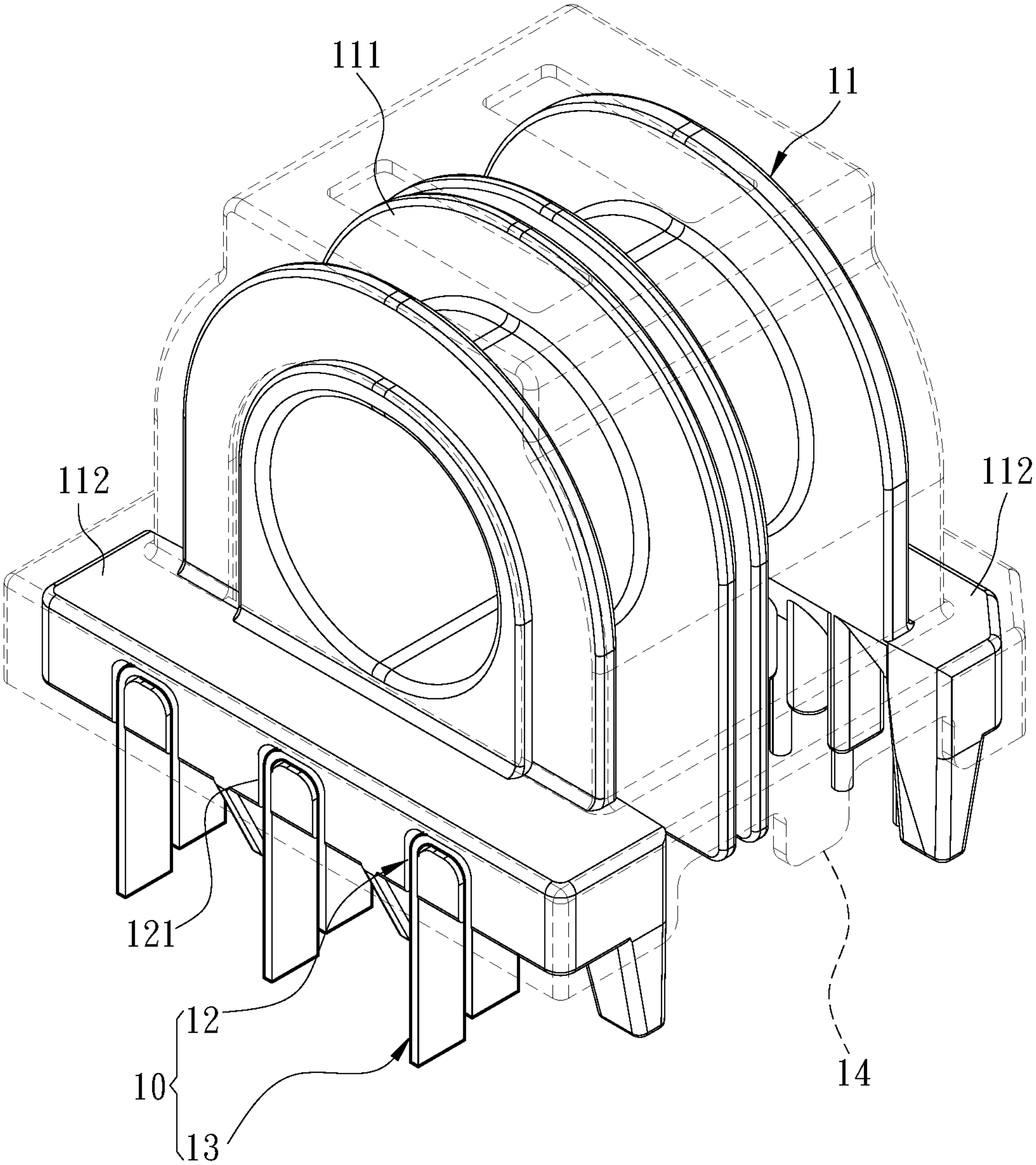
FIG. 5 is a schematic structural diagram of a transformer bobbin of another embodiment of the present invention.

Referring to FIG. 5 cooperatively, in one embodiment, the transformer bobbin 11 is provided with at least one cover 14 covering the two wire outlet parts 112 to limit the at least two conductive pins 13. Further, the at least one cover 14 can further cover the winding part 111 to achieve an isolation effect.

What is claimed is:

1. A pin structure of a transformer bobbin, wherein the transformer bobbin is provided with a winding part which is bound with at least one winding thereon, and at least one wire outlet part arranged on one side of the winding part, the pin structure comprising:

at least two accommodating slots, arranged at a spacing from one another at the at least one wire outlet part, wherein each of the at least two accommodating slots is formed with an entrance and two pin outlets located on a plane different from the entrance, and comprises two first sections respectively communicated with the two pin outlets, and a second section connected to the two first sections; and at least two conductive pins, respectively corresponded to the at least two accommodating slots, wherein each of the at least two conductive pins is placed via the entrance of each of the at least two accommodating slots, and comprises a connection section located in the second section and two exposed sections respectively connected to the connection section, the two exposed sections respectively extend to the two first sections and penetrate through the two pin outlets to an outside of the winding part, one of the two exposed sections is provided for performing socket welding, and the other one of the two exposed sections is bendable to define a tail end of the at least one winding together with the at least one wire outlet part.

2. The pin structure of the transformer bobbin according to claim 1, wherein each of the at least two accommodating slots is U-shaped, and each of the at least two conductive pins is also U-shaped.

3. The pin structure of the transformer bobbin according to claim 1, wherein one of the two exposed sections for performing socket welding is longer than the other one of the two exposed sections.

4. The pin structure of the transformer bobbin according to claim 3, wherein a length of one of the two exposed sections exposed to from the at least one wire outlet part without socket welding is greater than a length of the second section.

5. The pin structure of the transformer bobbin according to claim 4, wherein the transformer bobbin is provided with a cover at least covering the at least one wire outlet part to limit the at least two conductive pins.

6. The pin structure of the transformer bobbin according to claim 1, wherein the transformer bobbin is provided with a cover at least covering the at least one wire outlet part to limit the at least two conductive pins.

* * * * *